(12) United States Patent
Brittingham et al.

(10) Patent No.: US 8,157,525 B2
(45) Date of Patent: Apr. 17, 2012

(54) METHODS AND APPARATUS RELATING TO TURBINE AIRFOIL COOLING APERTURES

(75) Inventors: Robert A. Brittingham, Piedmont, SC (US); Paul S. Dimascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 12/274,553

(22) Filed: Nov. 20, 2008

(65) Prior Publication Data

US 2010/0124499 A1 May 20, 2010

(51) Int. Cl.
*F01D 5/08* (2006.01)
*F01D 5/18* (2006.01)
*B21D 53/78* (2006.01)
(52) U.S. Cl. .............. 416/96 A; 416/231 R; 29/889.721
(58) Field of Classification Search .................. None
See application file for complete search history.

(56) References Cited

U.S. PATENT DOCUMENTS

| 4,827,587 A | 5/1989 | Hall et al. |
| 6,238,183 B1 * | 5/2001 | Williamson et al. ........ 416/96 A |
| 6,318,963 B1 * | 11/2001 | Emery et al. ................ 416/96 A |
| 2003/0082048 A1 * | 5/2003 | Jackson et al. .............. 415/115 |
| 2008/0222874 A1 * | 9/2008 | Maurell et al. .................. 29/458 |

FOREIGN PATENT DOCUMENTS

EP 0326508 B1 1/1992

* cited by examiner

*Primary Examiner* — Scott B Geyer
(74) *Attorney, Agent, or Firm* — Mark E. Henderson; Ernest G. Cusick; Frank A. Langraff (57) ABSTRACT

An airfoil assembly for a turbine engine, that may comprise: an airfoil that includes at least one panel opening formed therein; and an aperture panel that includes at least one cooling aperture; wherein the panel opening and the aperture panel are configured such that, upon installation of the aperture panel within the panel opening, a substantially smooth outer surface of the airfoil is formed and at least one of the cooling apertures of the aperture panel forms an exit passageway from at least one hollow internal cavity within the airfoil.

24 Claims, 8 Drawing Sheets

METHODS AND APPARATUS RELATING TO TURBINE AIRFOIL COOLING APERTURES

BACKGROUND OF THE INVENTION

This present application relates generally to apparatus, methods and/or systems for improving the efficiency and/or operation of turbine engines, which, as used herein, is meant to include gas turbine engines, aircraft turbine engines, steam turbine engines, and other types of rotary engines. More specifically, but not by way of limitation, the present application relates to apparatus, methods and/or systems pertaining to turbine airfoil cooling orifices.

A gas turbine engine typically includes a compressor, a combustor, and a turbine. The compressor and turbine generally include rows of airfoils that are axially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. Then, the resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft.

In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, turbine airfoils, which, as described, generally include both the rotating rotor blades and the fixed, circumferentially-spaced stator blades, become highly stressed with extreme mechanical and thermal loads.

The ever-increasing demand for energy makes the objective of engineering more efficient turbine engines an ongoing and significant one. While several strategies for increasing the efficiency of turbine engines are known, it remains a challenging objective because these alternatives, which, for example, include increasing the size of the engine, increasing the temperatures through the hot-gas path, and increasing the rotational velocities of the rotor blades, generally place additional strain on parts, including additional strain on turbine airfoils, which, as stated, are already highly stressed. As a result, improved apparatus, methods and/or systems that reduce operational stresses and/or temperatures placed on turbine airfoils or allow the turbine airfoils to better withstand these stresses are in great demand.

As one of ordinary skill in the art will appreciate, one strategy for alleviating the distress of the airfoils is through cooling them such that the temperatures experienced by the airfoils are lower than that of the hot-gas path. Effective cooling, for example, may allow the airfoils to withstand higher firing temperatures, withstand greater mechanical stresses at high operating temperatures, and/or extend the part-life of the airfoil, all of which may allow the turbine engine to be more cost-effective and efficient in its operation. One way to cool airfoils during operation is through the use of internal cooling passageways or circuits. Generally, this involves passing a relatively cool supply of compressed air, which may be supplied by the compressor of the turbine engine, through internal cooling circuits within the airfoils. As the compressed air passes through the airfoil, it convectively cools the airfoil, which may allow the part to withstand firing temperatures that it otherwise could not.

In some instances, the supply of compressed air is released through small holes or apertures on the surface of the airfoils. Released in this manner, the air forms a thin layer or film of relatively cool air at the surface of the airfoil, which both cools and insulates the part from the higher temperatures that surround it. This type of cooling is commonly referred to as "film cooling." Generally, to adequately cool the airfoil, numerous film cooling apertures, which generally are hollow passageways from interior cavities to the surface of the part, are necessary. However, as one of ordinary skill in the art will appreciate, per conventional methods, cooling apertures of this nature are somewhat time-consuming to manufacture. More significantly, once drilled, the cooling apertures become substantially impossible to modify. Additionally, given the geometry and nature of an airfoil, it is very difficult to fabricate complex cooling apertures, which may allow for better cooling properties. As a result, there is a need for improved apparatus, methods and/or systems relating to the more efficient and cost effective creation of turbine cooling apertures.

BRIEF DESCRIPTION OF THE INVENTION

The present application thus describes an airfoil assembly for a turbine engine, that may comprise: an airfoil that includes at least one panel opening formed therein; and an aperture panel that includes at least one cooling aperture; wherein the panel opening and the aperture panel are configured such that, upon installation of the aperture panel within the panel opening, a substantially smooth outer surface of the airfoil is formed and at least one of the cooling apertures of the aperture panel forms an exit passageway from at least one hollow internal cavity within the airfoil.

The present application further describes a method of manufacturing a turbine engine airfoil that includes a hollow internal cavity that is enclosed by an outer-wall having at least one cooling aperture therethrough, the method including the steps of: forming an airfoil with a panel opening, wherein the panel opening comprises a removed section of the outer-wall that encloses the hollow internal cavity; forming an aperture panel that includes at least one cooling aperture, wherein the aperture panel comprises a similar size and shape as the panel opening such that the aperture panel, upon installation into the panel opening, fits snugly inside the panel opening; and installing the aperture panel within the panel opening.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
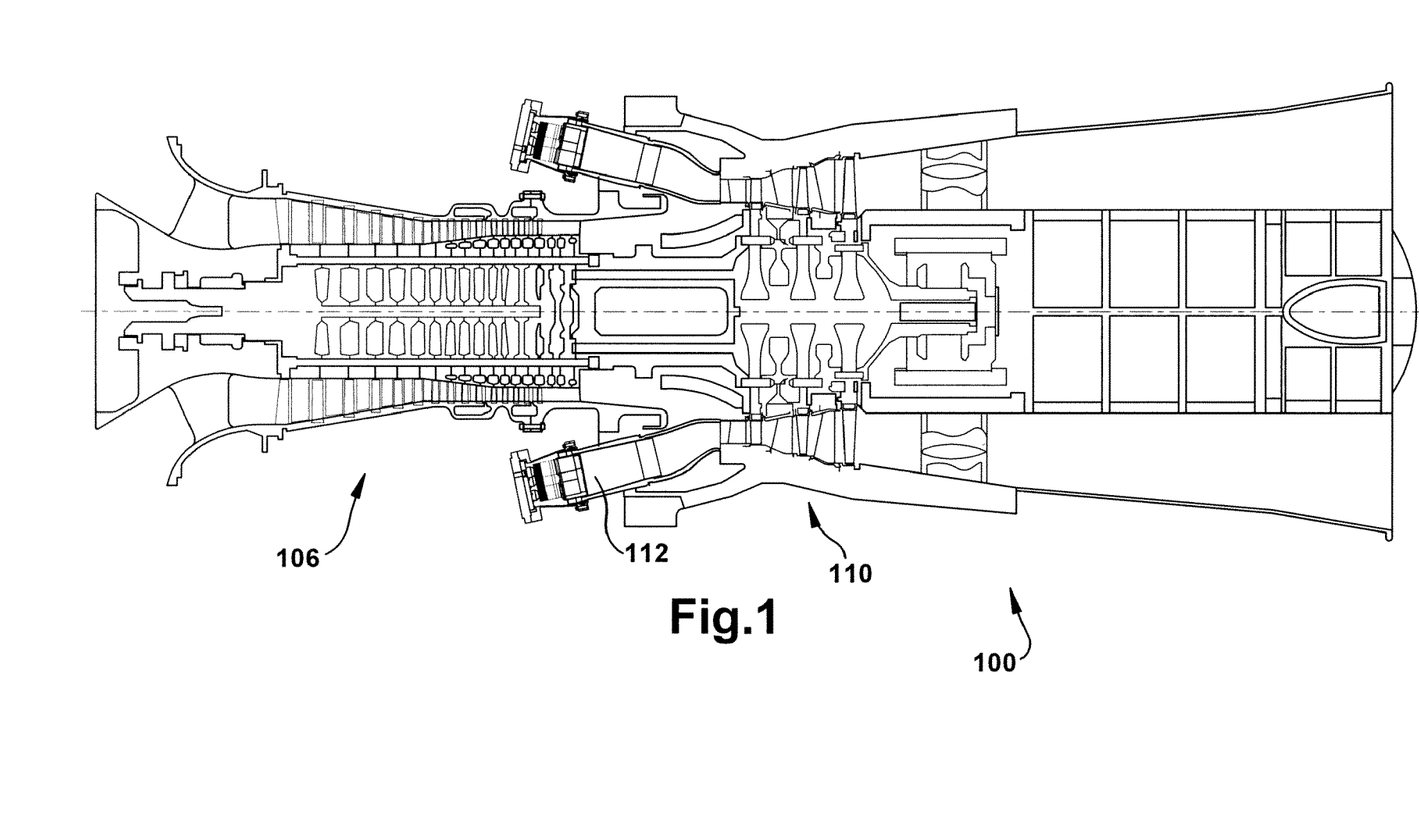
FIG. 1 is a schematic representation of an exemplary turbine engine in which certain embodiments of the present invention may be used.

Referring now to the figures, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
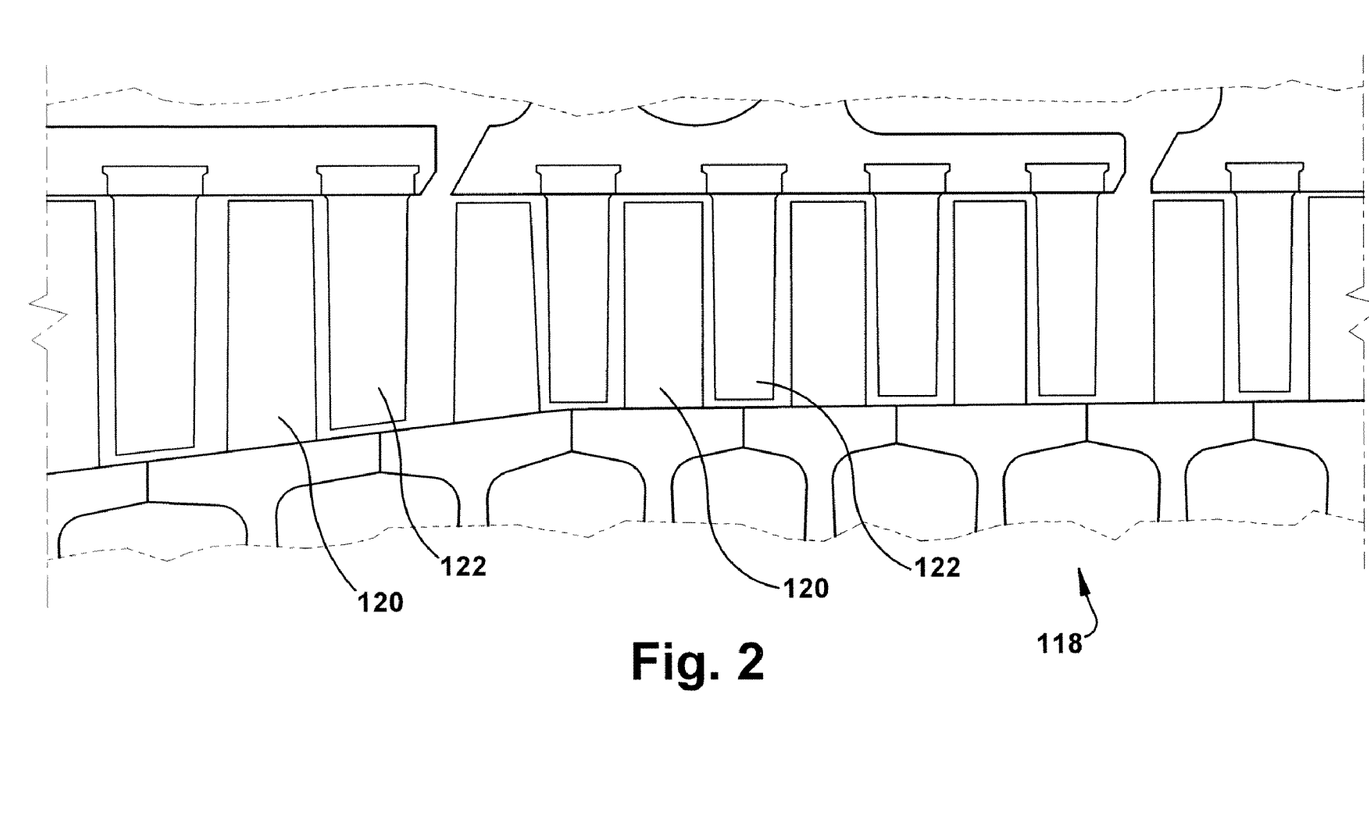
FIG. 2 is a sectional view of the compressor section of the gas turbine engine of FIG. 1.

FIG. 2 illustrates a view of an exemplary multi-staged axial compressor 118 that may be used in a gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced and attached to the shaft, when the shaft rotates during operation, the compressor rotor blades 120 rotates about it. As one of ordinary skill in the art will appreciate, the compressor rotor blades 120 are configured such that, when spun about the shaft, they impart kinetic energy to the air or working fluid flowing through the compressor 118. The compressor 118 may have many other stages beyond the stages that are illustrated in FIG. 2. Additional stages may include a plurality of circumferential spaced compressor rotor blades 120 followed by a plurality of circumferentially spaced compressor stator blades 122.

Figure 3:
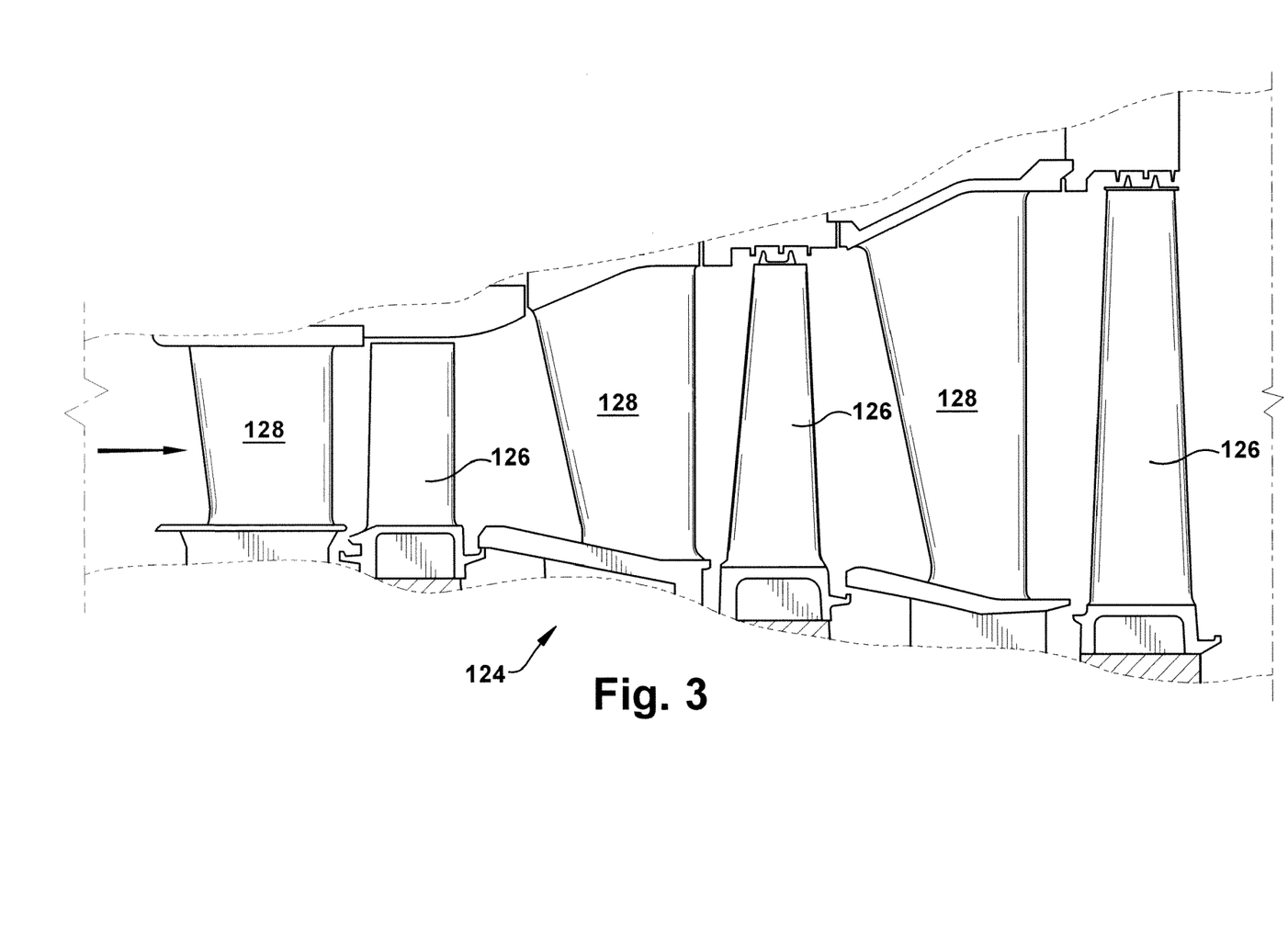
FIG. 3 is a sectional view of the turbine section of the gas turbine engine of FIG. 1.

FIG. 3 illustrates a partial view of an exemplary turbine section or turbine 124 that may be used in the gas turbine engine. The turbine 124 also may include a plurality of stages. Three exemplary stages are illustrated, but more or less stages may present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 also is illustrated. The second stage similarly includes a plurality of circumferentially spaced turbine stator blades 128 followed by a plurality of circumferentially spaced turbine rotor blades 126, which are also mounted on a turbine wheel for rotation. A third stage is illustrated, and similarly includes a plurality of turbine stator blades 128 and rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond the stages that are illustrated in FIG. 3. Each additional stage may include a row of turbine stator blades 128 followed by a row of turbine rotor blades 126.

Note that as used herein, reference, without further specificity, to "rotor blades" is a reference to the rotating blades of either the compressor 118 or the turbine 124, which include both compressor rotor blades 120 and turbine rotor blades 126. Reference, without further specificity, to "stator blades" is a reference to the stationary blades of either the compressor 118 or the turbine 124, which include both compressor stator blades 122 and turbine stator blades 128. The term "airfoil" will be used herein to refer to either type of blade. Thus, without further specificity, the term "airfoil" is inclusive to all type of turbine engine blades, including compressor rotor blades 120, compressor stator blades 122, turbine rotor blades 126, and turbine stator blades 128.

In use, the rotation of compressor rotor blades 120 within the axial compressor 118 may compress a flow of air. In the combustor 112, energy may be released when the compressed air is mixed with a fuel and ignited. The resulting flow of hot gases from the combustor 112 then may be directed over the turbine rotor blades 126, which may induce the rotation of the turbine rotor blades 126 about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades 120, such that the necessary supply of compressed air is produced, and also, for example, a generator to produce electricity.

Figure 4:
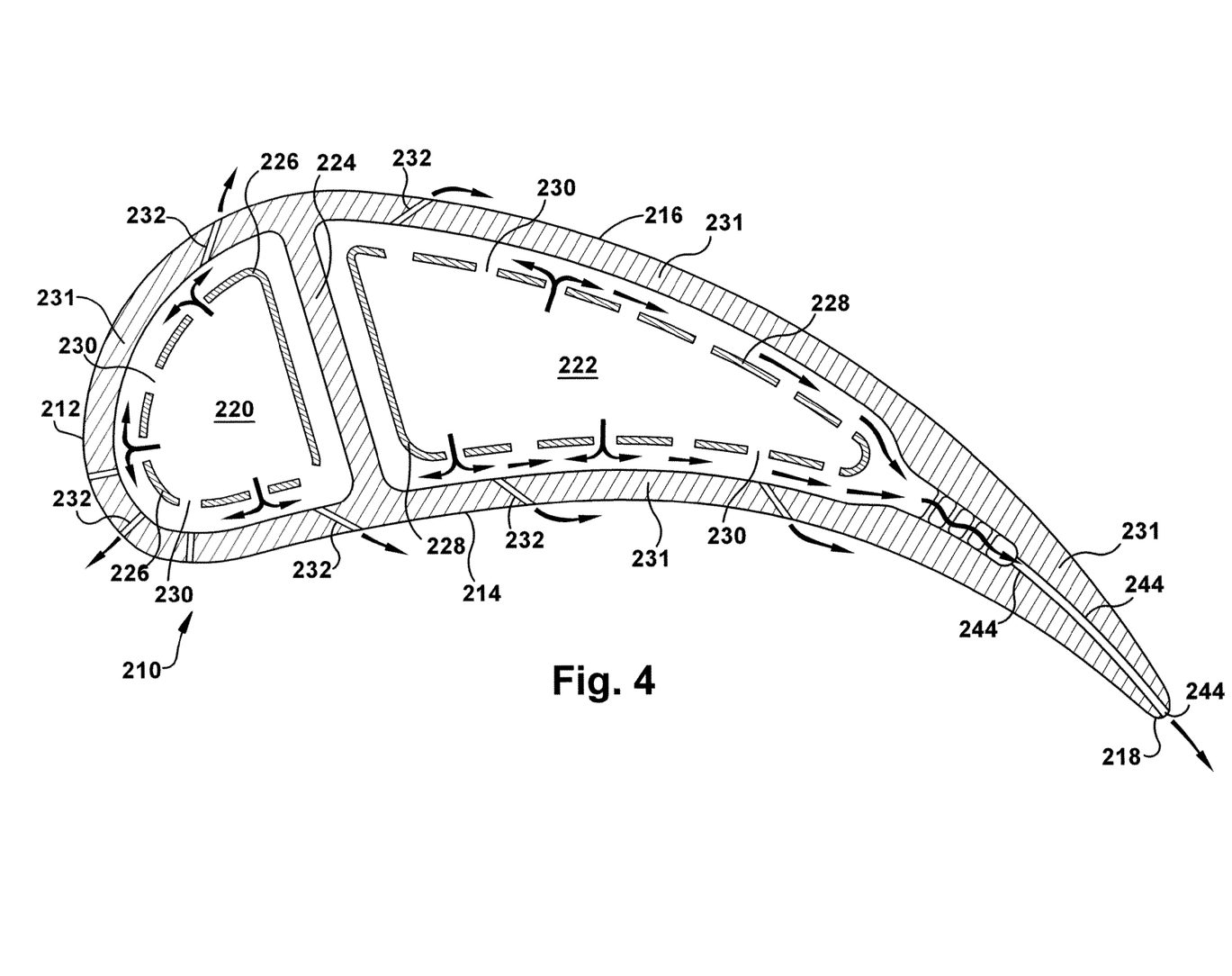
FIG. 4 is a cross-sectional view of an airfoil illustrating an internal cooling circuit and film cooling holes according to conventional airfoils.

FIG. 4 illustrates a cross-section of an airfoil 210 having film cooling holes or cooling apertures, as described in more detail below. As shown, each airfoil 210 comprises an airfoil shaped configuration having a nose or leading edge 212, a pressure side or surface 214, a suction side 216 and a trailing edge 218. The airfoil 210 is generally hollow and divided into two internal chambers 220, 222 by an intermediate partition 224. Each chamber 220, 222 encloses a hollow insert 226, 228 having a configuration generally conforming to the internal contour of the respective chamber but in spaced relation thereto. The inserts 226, 228 contain insert apertures 230 in preselected locations. High pressure cooling air from the turbine compressor 106 is directed into the inserts 226, 228 per conventional systems and methods, and is exhausted through such the insert apertures 230 to form jets of air striking the inner side of the outer-walls 231 for impingement cooling (as shown by the arrows).

More particularly, the insert apertures 230 of insert 226 in the leading edge chamber 220 are located to impinge on the outer-wall 231 opposite the insert 226. The cooling air forced into the leading edge chamber 220 from the insert 226 is exhausted through radially spaced rows of cooling apertures 232. This exhausted cooling air provides a layer of boundary air adjacent the exterior surfaces of the airfoil to limit direct contact of the hot fluid on such surfaces to inhibit heat transfer to the airfoil from the working fluid. The cooling air within the trailing edge chamber 222 is exhausted therefrom either through cooling apertures 232 or through a slit or trailing edge cooling aperture 244 extending from the trailing edge chamber 222 to the trailing edge 218 of the airfoil.

Figure 5:
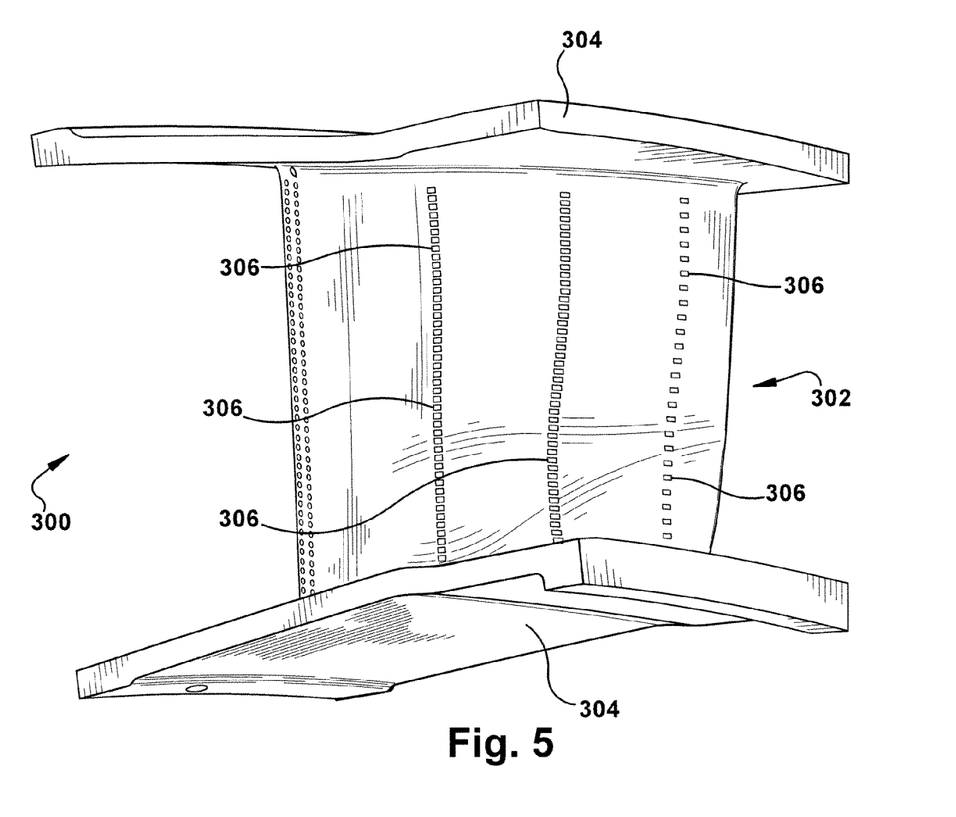
FIG. 5 is a perspective view of an exemplary stator blade with cooling apertures that may be used in the turbine section of a gas turbine engine.

FIG. 5 is a perspective view of a conventional turbine stator blade 300. A turbine stator blade 300 generally includes an airfoil shape 302 that is flanked by endwalls 304 to each side. The endwalls 304 attach the turbine stator blade 300 to turbine casing. As shown, the turbine stator blade 300 includes multiple cooling apertures 306. Generally, cooling apertures, such as the ones shown, are grouped or arranged in a pattern. As shown, the cooling apertures 306 may be arranged in rows where the cooling apertures 306 are radial spaced along an axial position.

Figure 6:
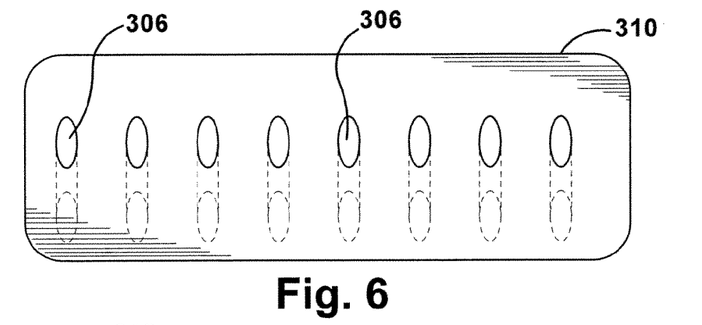
FIG. 6 is a top view of an aperture panel according to an exemplary embodiment of the present invention.
Figure 7:
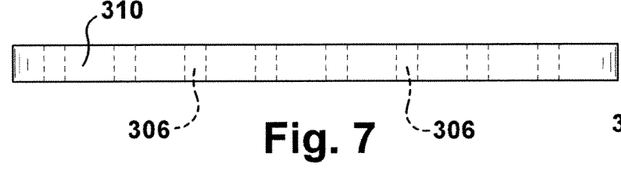
FIG. 7 is a side view of the aperture panel shown in FIG. 6.
Figure 8:
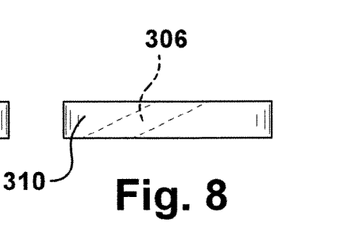
FIG. 8 is a front view of the aperture panel shown in FIG. 6.

FIGS. 6, 7 and 8 illustrate a top, front and side view of an aperture panel 310 according to an exemplary embodiment of the present application. As shown, the aperture panel 310 may be rectangular in nature, though other shapes for other applications are possible. The aperture panel 310 may have multiple cooling apertures 306 formed therein. Cooling apertures 306, as formed on the aperture panel 310, generally are hollow passageways that extend through the thickness of the aperture panel 310. In some embodiments, the cross-section of the cooling apertures 306 passageway may be circular or oval in shape. In some embodiments, between 20 and 50 cooling apertures 306 may be formed in the panel 310. The cooling apertures 306 may be arranged in several patterns or arrangements depending on the application. As shown, the cooling apertures 306 may be arranged in a single row that extends along the length of the rectangle. The cooling apertures 306 may extend through the thickness of the panel 310 at an angle, i.e., not perpendicular to the top and bottom surfaces of the panel, which is best illustrated in FIG. 8. Aperture panels 310 may be made of several materials, including nickel-based super-alloys, ceramic materials, or other similar materials.

Figure 9:
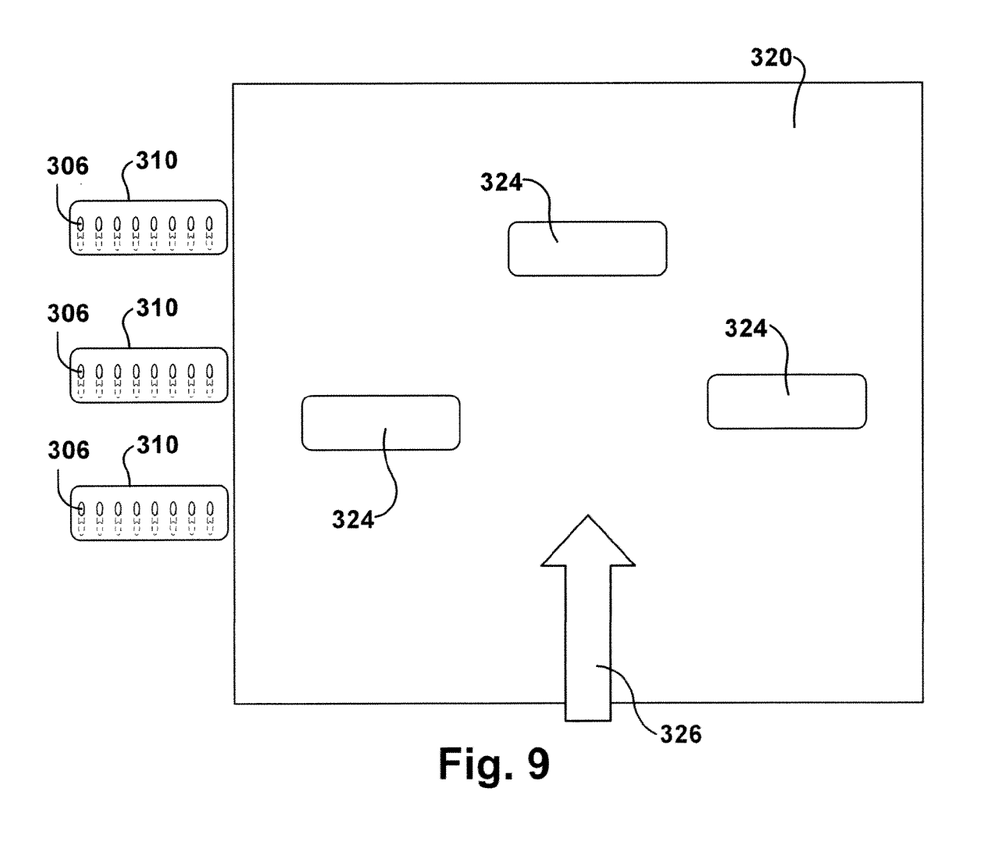
FIG. 9 is a view of surface area of a turbine engine airfoil with panel openings and several uninstalled aperture panels according to an exemplary embodiment of the present invention.

FIG. 9 illustrates the surface of an exemplary airfoil 320 with three panel openings 324 that are configured to engage aperture panels 310 such that, upon engagement, multiple cooling apertures 306 are created in the airfoil 320 without the need for individually drilling the airfoil to form each one. The direction of flow during operation is referenced with arrow 336. Panel openings 324 generally are openings through the outer-wall of the airfoil 320 which are shaped to receive an aperture panel 310 and that a snug fit may be achieved between the panel opening 324 and an aperture panel 310 on installation. That is, a panel opening 324 may generally be thought of as a removed section of the outer-wall 231. (As used herein, "removed" is intended to mean that the relevant section of outer-wall does not exist, which includes cases where the section of outer-wall was removed and where the airfoil was formed without the section of outer-wall in place.) For that matter, an aperture panel 310 may be thought of as a piece shaped to fit the panel opening 324 that is similar, except for the pre-formed cooling apertures 306, to the missing section of outer-wall 231 had it, in fact, been removed from the airfoil. Further, in some embodiments, a panel opening 324 may be configured such that, upon the aperture panel's 310 engagement within the panel opening 324, the cooling apertures 306 of the aperture panel 310 form an exit passageway from the hollow cooling cavities within the airfoil 320 (for example, the previously described leading edge internal chamber 220 or the trailing edge internal chamber 222) to the surface of the airfoil 320.

Figure 10:
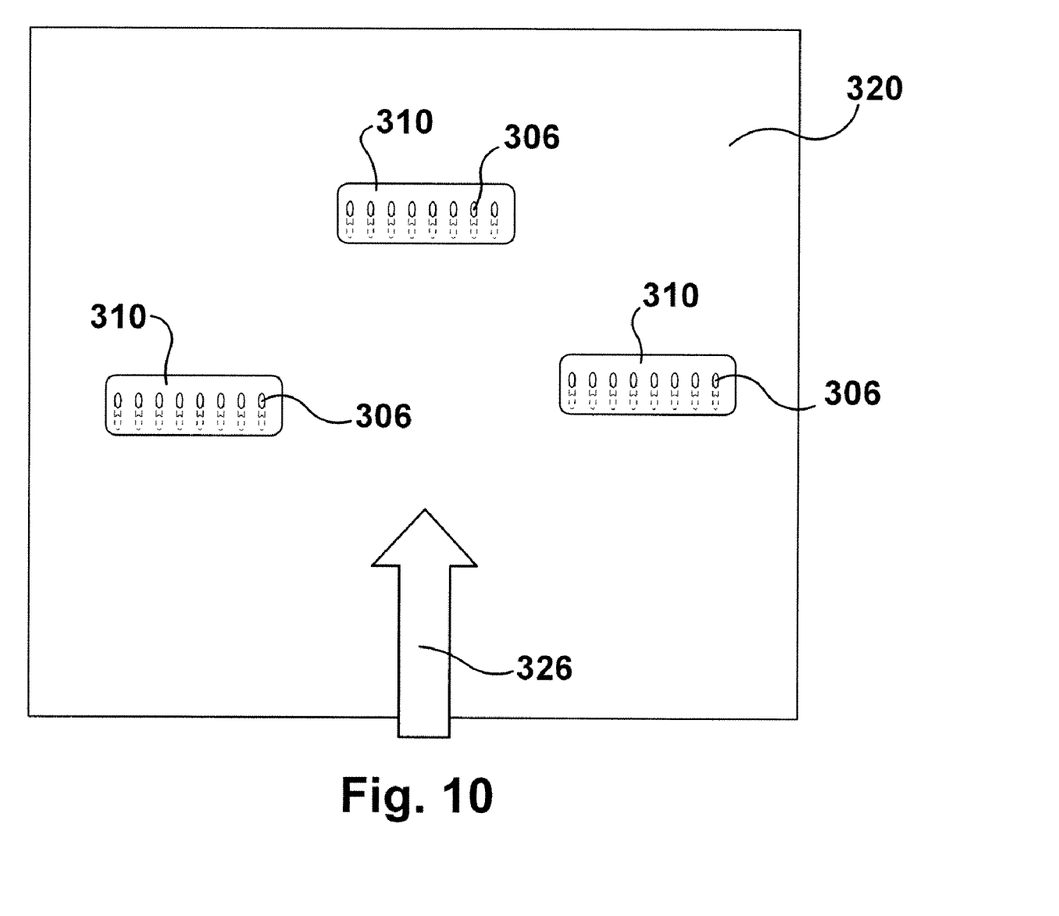
FIG. 10 is the same view of FIG. 9 with the several aperture panels properly positioned over the panel openings.

FIG. 10 illustrates the airfoil 320 after the aperture panels 310 have been installed into the panel openings 324. Generally, with the aperture panel 310 fitted properly into the panel opening 324, the outer surface of the aperture panel 310 will be substantially flush with the outer surface of the airfoil 300. FIG. 10 further illustrates how the panels 310 may be oriented in relation to the flow through the turbine, the direction of which is shown by the arrow 326. As shown, the aperture panels 310 may be oriented such that the cooling apertures 306 "point" downstream. That is, the aperture panels 310 may be oriented such that the angle of the cooling apertures 306 provides that the coolant is discharged in a general downstream direction.

Figure 11:
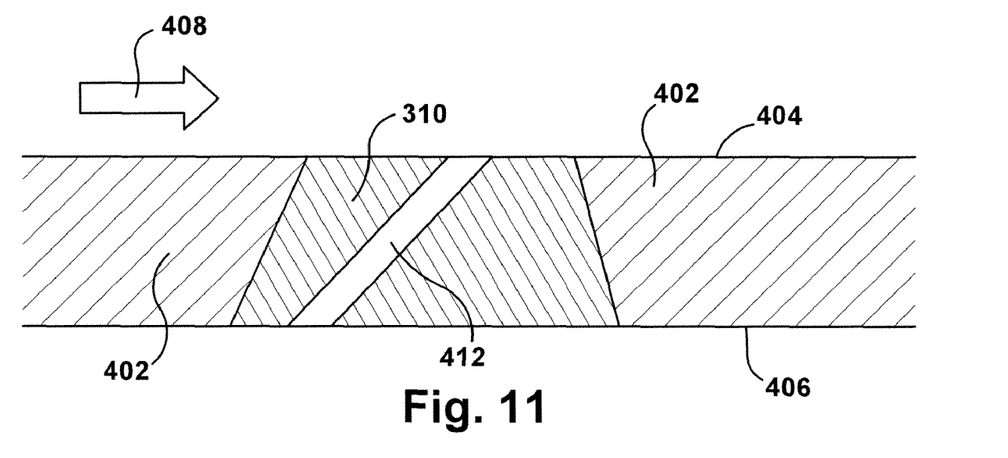
FIG. 11 is a section view of the outer-wall and aperture panel of an airfoil according to an exemplary embodiment of the present invention.

FIG. 11 illustrates a cross-sectional view through an outer-wall 402 of an airfoil and the aperture panel 310 according to an exemplary embodiment of the present application. As one of ordinary skill in the art will appreciate, the outer-wall 402 may have a hot-side 404, which is the side exposed to the hot-gas path of the turbine engine, and a cold-side 406, which generally is the side exposed to one of the interior hollow cavities of the airfoil, i.e., the internal cooling passageways of the airfoil. As shown, in some embodiments, the length and/or width of the panel opening 324 may be tapered such that the length and/or width is greater at the cold-side 406 than it is at the hot-side 404. The aperture panel 310 may be similar in shape such that the panel 310 engages the opening 324 as shown. This configuration prevents the panel 310 from disengaging from the opening 324 in an outward direction from the airfoil such that the disengaged aperture panel 310 would enters the flow of working fluid (the direction of which is shown by arrow 408). The aperture panel 310, of course, would damage downstream components if it broke free into the flow of working fluid. Further, as one of ordinary skill in the art will appreciate, the working pressure inside the airfoil is greater than the pressure of the working fluid. This pressure differential, given the tapered shape shown in FIG. 11, acts to hold the panel 310 in place during operation. The installed aperture panel 310 also may be fixed in place by a brazed connection or a weld connection or mechanical connection between it and the panel opening 324. In an alternative embodiment, the taper may be reversed such that such that the length and/or width is less at the cold-side 406 than it is at the hot-side 404. This arrangement would allow, for example, convenient installation of the aperture panel 310 from the outside of the airfoil.

Figure 12:
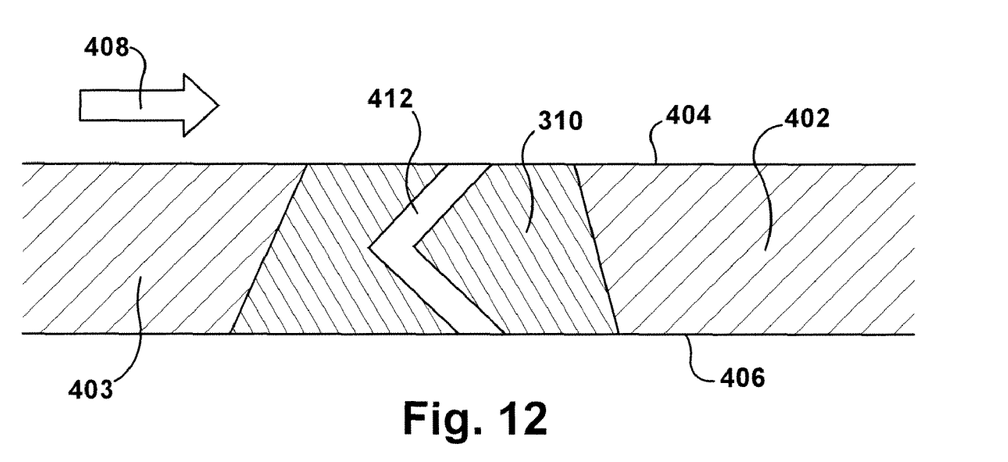
FIG. 12 is a section view of the outer-wall and aperture panel of an airfoil according to an alternative exemplary embodiment of the present invention.

FIG. 12 is a cross-sectional view through an outer-wall 402 of an airfoil and the aperture panel 310 according to an alternative embodiment of the present invention. As shown, in this embodiment, the path of the cooling aperture 412 changes direction as it extends through the aperture panel 310, forming an approximate elbow turn. In such instances, often a metered slot (not shown) may be formed, wherein multiple apertures feed a single metered slot. The elbow turn may constitute a change in direction of approximately 90 degrees. In some embodiments, the elbow turn may constitute a change in direction of between 70 and 110 degrees. More specifically, starting at the cold-side 406, the cooling aperture 412 may be angled in an upstream direction (i.e., such that it extends from the cold-side 406 toward a point on the hot-side 404 that is located further upstream than the point of the beginning location on the cold-side 406). Approximately half-way through the aperture panel 310, the direction of the cooling aperture 412 may bend approximately 90 degrees (or, in some cases, the apertures may feed into a metered slot that is oriented in another direction). With this direction change, the direction of the cooling aperture 412 is generally angled in a downstream direction (i.e., such that it extends from the location of the direction change toward a point on the hot-side 404 that is located further downstream than the axial location of the direction change). As one of ordinary skill in the art will appreciate, cooling apertures of this configuration are advantageous because, with the bend in flow direction, the same flow of coolant results in an increased level of cooling. Generally, however, such configurations were extremely difficult and/or costly to produce because the change in direction required drilling from both sides of the outer-wall of the airfoil, i.e., from the exterior of the airfoil and from the interior cavities of the airfoil. This difficulty is removed with the use of the aperture panel 310 because the apertures and/ metered slot can be drilled before being installed within the panel opening 324.

Note that in portions of this application, the invention was described in relation to its use in a stator blade located in the turbine section of a gas turbine engine. The present invention is not limited to this type of application and, as one of ordinary skill in the art will appreciate, the present invention may be used with other types of turbine airfoils, including rotor blades.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. An airfoil assembly for a turbine engine, comprising:
   an airfoil that includes at least one panel opening formed therein; and
   an aperture panel that includes at least one cooling aperture;
   wherein the panel opening and the aperture panel are configured such that, upon installation of the aperture panel within the panel opening, a substantially smooth outer surface of the airfoil is formed and at least one of the cooling apertures of the aperture panel forms an exit passageway from at least one hollow internal cavity within the airfoil.

2. The turbine engine airfoil assembly according to claim 1, wherein:
   an outer-wall of the airfoil comprises the outermost wall of the airfoil that encloses the hollow internal cavity of the airfoil;
   the panel opening comprises a removed section of an outer-wall of the airfoil;
   the aperture panel comprises a similar shape and size as the panel opening such that the aperture panel fits snugly into the panel opening;
   the cooling aperture comprises a hollow passageway that extend through the thickness of the aperture panel; and
   the aperture panel comprises at least a plurality of cooling apertures.

3. The turbine engine airfoil assembly according to claim 1, wherein the cross-sectional shape of the cooling aperture comprises one of a circular shape, an elliptical shape, a rectangular shape, and a trapezoidal shape; and
   wherein the aperture panel and the panel opening both comprise an approximate rectangular shape.

4. The turbine engine airfoil assembly according to claim 3, wherein the aperture panel includes between 20 and 50 cooling apertures.

5. The turbine engine airfoil assembly according to claim 1, wherein the cooling aperture extends through the thickness of the aperture panel at an angle such that, upon installation in the panel opening, the cooling aperture points in an approximate downstream direction.

6. The turbine engine airfoil assembly according to claim 1, wherein the aperture panel comprises one of a nickel-based super alloy and a ceramic material.

7. The turbine engine airfoil assembly according to claim 1, wherein the aperture panel comprises a material that is different from the material of the airfoil.

8. The turbine engine airfoil assembly according to claim 1, wherein the aperture panel comprises a material that is the same as the material of the airfoil.

9. The turbine engine airfoil assembly according to claim 1, wherein the panel opening and the aperture panel are tapered such that the taper substantially inhibits the aperture panel from dislodging from the airfoil.

10. The turbine engine airfoil assembly according to claim 9, wherein the taper of the panel opening includes at least one of the width and length of the panel being greater at an inner surface of an outer-wall than at an outer surface of the outer-wall.

11. The turbine engine airfoil assembly according to claim 1, wherein the panel opening and the aperture panel are tapered such that the taper facilitates positioning the aperture panel in a desired installed position from the exterior of the airfoil.

12. The turbine engine airfoil assembly according to claim 11, wherein the taper of the panel opening includes at least one of the width and length of the panel being less at an inner surface of an outer-wall than at an outer surface of the outer-wall.

13. The turbine engine airfoil assembly according to claim 1, wherein the aperture panel is fixed in the panel opening by one of a brazed connection, a weld connection, and a mechanical connection.

14. The turbine engine airfoil assembly according to claim 1, wherein the airfoil comprises a stator blade of a turbine section of a gas turbine engine.

15. The turbine engine airfoil assembly according to claim 1, wherein the path of the cooling aperture through the aperture panel comprises an elbow-turn of between 70-110 degrees.

16. A method of manufacturing a turbine engine airfoil that includes a hollow internal cavity that is enclosed by an outer-wall having at least one cooling aperture therethrough, the method including the steps of:
   forming an airfoil with a panel opening, wherein the panel opening comprises a removed section of the outer-wall that encloses the hollow internal cavity;
   forming an aperture panel that includes at least one cooling aperture, wherein the aperture panel comprises a similar size and shape as the panel opening such that the aperture panel, upon installation into the panel opening, fits snugly inside the panel opening; and
   installing the aperture panel within the panel opening.

17. The method according to claim 16, further including the step of forming a aperture panel that includes at least one cooling aperture, wherein the aperture panel comprises a configuration in which the aperture panel, upon installation into the panel opening, forms a substantially smooth outer surface of the airfoil and the cooling aperture of the aperture panel forms an exit passageway from the hollow internal cavity.

18. The method according to claim 16, wherein the cooling aperture formed through the aperture panel extends through the thickness of the aperture panel at an angle and is further configured such that, upon installation in the panel opening, the cooling aperture points in an approximate downstream direction.

19. The method according to claim 16, wherein the airfoil comprises a stator blade of a turbine section of a gas turbine engine.

20. The method according to claim 16, wherein the panel opening and the aperture panel are tapered such that the taper substantially inhibits the aperture panel from dislodging from the airfoil.

21. The method according to claim 20, wherein the taper of the panel opening includes at least one of the width and length of the panel being greater at an inner surface of an outer-wall than at an outer surface of the outer-wall.

22. The method according to claim 16, wherein the path of the cooling aperture through the aperture panel comprises an elbow-turn of between 70-110 degrees.

23. The method according to claim 16, wherein the panel opening and the aperture panel are tapered such that the taper facilitates positioning the aperture panel in a desired installed position from the exterior of the airfoil.

24. The method according to claim 23, wherein the taper of the panel opening includes at least one of the width and length of the panel being less at an inner surface of an outer-wall than at an outer surface of the outer-wall.

* * * * *